Nov. 17, 1964   G. D. FRASER   3,157,350
ROTARY FLUID MACHINE

Filed June 11, 1963   2 Sheets-Sheet 1

INVENTOR.
GROVER D. FRASER
BY
David W. Tilbott
ATTORNEY

Nov. 17, 1964    G. D. FRASER    3,157,350
ROTARY FLUID MACHINE

Filed June 11, 1963    2 Sheets-Sheet 2

INVENTOR.
GROVER D. FRASER
BY
David W. Tibbott
ATTORNEY

United States Patent Office 3,157,350
Patented Nov. 17, 1964

3,157,350
ROTARY FLUID MACHINE
Grover D. Fraser, Painted Post, N.Y., assignor to Ingersoll-Rand Company, New York, N.Y., a corporation of New Jersey
Filed June 11, 1963, Ser. No. 287,105
5 Claims. (Cl. 230—140)

This invention relates to rotary fluid machines of the type having engaged toothed rotors which cooperate to form variable-volume fluid displacement chambers between the rotor teeth.

Most gear-rotor type of rotary fluid machines suffer from the problem of fluid leaking past the end faces of the gear-rotors. Such leakage is usually caused by the rotors being subject to differential pressures at different locations on their end faces which causes the rotors to be bent or tilted relative to their proper rotation axes to create leakage paths.

The principal object of this invention is to eliminate or substantially minimize the foregoing problem and to provide a gear-rotor fluid machine having toothed rotors which are subject to balanced pressures so that the rotors maintain their proper rotation axes during operation.

Other important objects include the following: to provide a new type of toothed-rotor fluid machine having rotors which are subject to balanced pressure; to provide a rotary fluid machine which is unusually compact and relatively simple to manufacture and to operate; to provide a toothed-rotor type of fluid machine wherein the variable-volume fluid displacement chambers formed by the teeth have their outer ends sealed by means which rotate with the toothed rotors; and to provide a toothed-rotor fluid machine construction having means for holding the toothed rotors in a relatively fixed relationship with adjacent sealing surfaces for preventing leakage between the end faces of the rotors and the sealing surfaces.

In brief, the above objects are attained by fixing a pair of axially-spaced internally-toothed rotors in a drum which is rotatively mounted on a support, mounting a pair of axially-spaced externally-toothed rotors eccentrically on the support within the internally-toothed rotors to rotate with and engage the internally-toothed rotors and form a series of variable-volume fluid displacement chambers between the rotor teeth as the drum and rotors rotate, fixing means on the drum to cover the outer ends of the fluid displacement chambers, mounting a plate on the support between the axially-spaced rotors to close the inner ends of the chambers and providing the plate with fluid inlet and outlet conduits for conducting fluid to and from the chambers.

Figure 1:
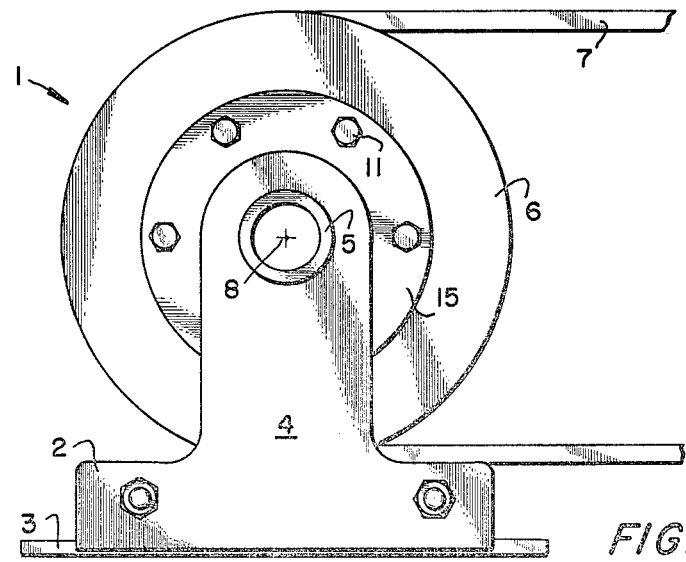
Figure 2:
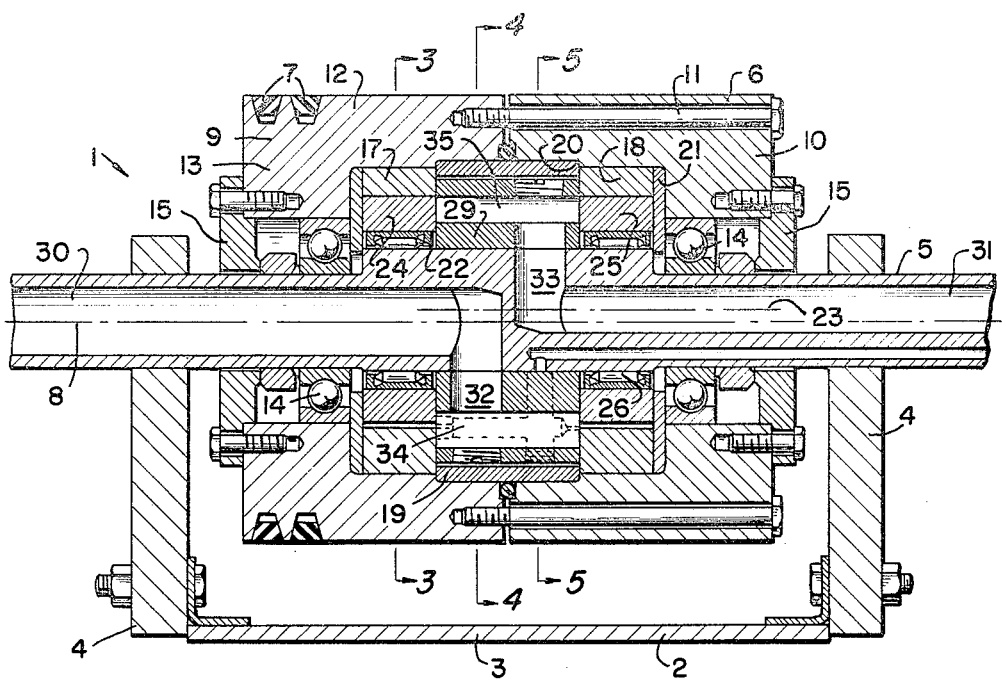
Figure 3:
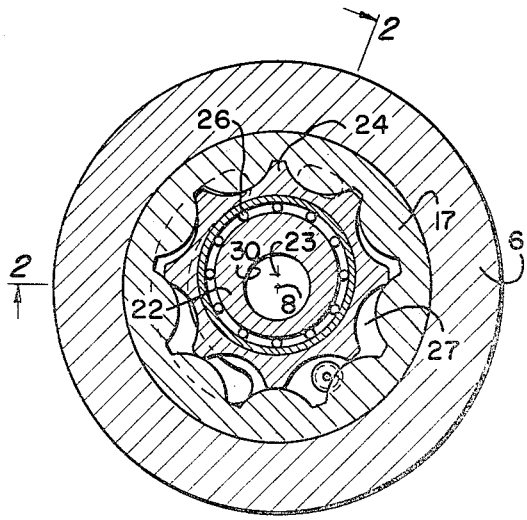
Figure 4:
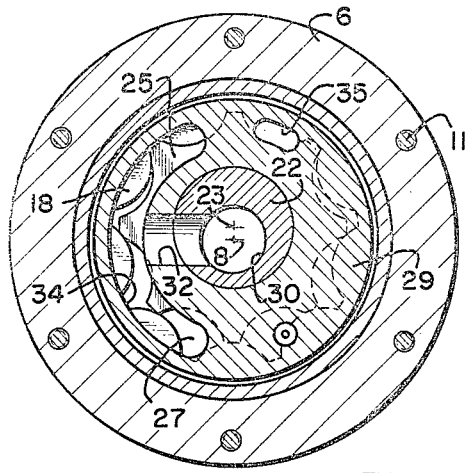
Figure 5:
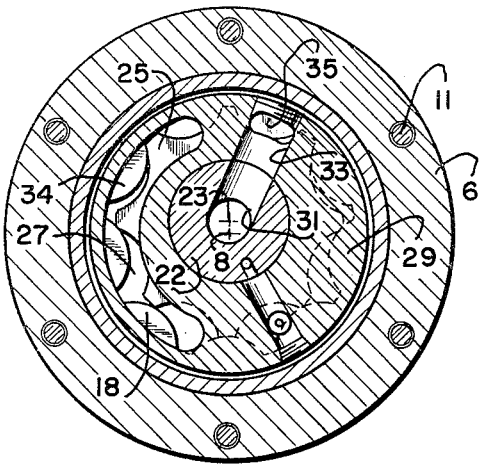

The invention is described in connection with the accompanying drawings wherein:

FIGURE 1 is an end elevational view of the rotary fluid machine of this invention;

FIG. 2 is an enlarged axial section of the rotary fluid machine taken along the line 2—2 of FIG. 3; and FIGS. 3 to 5 are reduced scale sections taken respectively along corresponding lines 3—3, 4—4, and 5—5 in FIG. 2.

The rotary fluid machine 1 shown in the drawings is adapted to handle a gaseous fluid and may either be operated as a fluid motor or as a fluid compressor. The rotary fluid machine 1 is generally of the type known as a gear-rotor machine wherein an external gear rotor rotates eccentrically inside of an internal gear rotor with the gear teeth of the two rotors engaging and forming a series of variable-volume fluid displacement chambers between the teeth.

The rotary fluid machine 1 is shown in FIGS. 1 and 2 as having a support frame 2 including a base 3 and a pair of horizontally-spaced vertical uprights 4. An elongated horizontal shaft 5 is fixed on the two uprights 4, as shown in FIG. 2, and a drum 6 is rotatably mounted on the shaft 5. When used as a compressor, the drum 6 is adapted to be rotatably driven by conventional means, such as the V-belts 7, shown in FIG. 2, fitting in pulley grooves provided in the circumference of the drum 6. Alternately, when used as a motor, the drum 6 drives the belts 7. The rotary axis of the drum 6 is designated by the reference number 8.

The drum 6 is formed of a pair of cup-shaped half sections 9 and 10 which are bolted together by horizontal bolts 11 extending through the annular sides 12 of each drum half section 9 and 10. Each drum half section also includes a disc-shaped end wall 13 which is axially mounted on a ball bearing 14 carried on the shaft 5, as shown in FIG. 2. Each end wall 13 carries a bearing cover 15 covering the outer face of the bearing 14.

The drum 6 carries a pair of axially-spaced internally-toothed outer gear rotors 17 and 18 mounted rigidly within the drum 6 and concentric to the drum rotation axis.

The two outer gear rotors 17 and 18 are clamped against the opposite end edges of a spacer ring 19 disposed between the two gear rotors 17 and 18. This clamping function is performed by the two drum half sections 9 and 10 being clamped axially together by the drum bolts 11. The spacer ring 19 fits in internal rabbets 20 provided in the drum half sections 9 and 10. The rabbets 20 lock the spacer ring 19 in its proper position. An annular washer 21 is rigidly clamped between the outer face of each gear rotor 17 and 18 and the respective drum half sections 9 and 10. Thus, the bolts 11 hold or clamp together the drum half sections 9 and 10, the outer gear rotors 17 and 18, the spacer ring 19 and the outer annular washers 21 as a single unit which rotates about the drum axis 8.

The shaft 5 carries a middle portion 22 which is eccentrically journaled about an eccentric axis 23 and a pair of axially-spaced externally-toothed inner gear rotors 24 and 25 are rotatively mounted by roller bearings 26 on the eccentric journal 22 to rotate about the eccentric axis 23. Both the outer and inner gear rotors 17, 18 and 24, 25 have engaged sprocket-shaped teeth with the inner gear rotors 24 and 25 having one less tooth than the outer rotors 17 and 18. As the engaged rotors turn about the different axes 8 and 23, the engaged teeth form variable-volume chambers 27 between adjacent pairs of teeth.

The operation principle of this type of gear-rotor compressor is well known in the art. Therefore, it is not believed to be necessary to repeat such principle in detail in this specification. For detailed information regarding the operation principle of this type of compressor, the reader is referred to U.S. Patent No. 2,547,392, issued April 3, 1951, to M. F. Hill et al.

A stationary annular plate 29 is fixed on the shaft 5 between the two pairs of gear rotors 17, 18 and 24, 25 and seats against the end faces of the gear rotors 17, 18, 24, and 25 to seal the inner ends of the chambers 27. The outer ends of the chambers 27 are sealed by the outer washers 21 which are clamped against the outer end faces of the outer rotors 17 and 18. The outer washers 21 slidably engage the end faces of the inner rotors 24 and 25 sufficiently to substantially prevent leakage between the washers 21 and the inner rotors 24 and 25. In addition, the engagement between the inner faces of both pairs of rotors 17, 18, 24, and 25 and the intermediate stationary plate 29 is sufficiently tight to substantially prevent leakage past the sliding joint therebetween.

Fluid is admitted into and exhausted from the chambers 27 by means of passages and conduits provided in the shaft 5 and the stationary plate 29. The shaft 5 contains an inlet passage 30 and an outlet passage 31 which are separate from each other and open at the opposite ends of the shaft 5. The inner ends of the passages 30 and 31 open radially into respective inlet and outlet conduits 32 and 33 formed in the stationary plate 29.

The inlet conduit 32 opens into an arcuate slot 34 which serves as an inlet port to the chambers 27 on both end faces of the stationary plate 29. The slot 34 extends entirely through and opens on both end faces of the stationary plate 29.

The outlet conduit 33 opens into a hole 35 which is drilled longitudinally through the plate 29 and opens on both of its end faces. The hole 35 serves as an outlet port for the chambers 27. The port 35 is located in the plate 29 at a point where the chambers 27 have a minimum volume.

It should be recognized that the angular location of the ports 34 and 35 will depend on the direction of rotation of the machine. In the embodiment shown in FIGS. 3 to 5, the drum 6 should rotate in the counterclockwise direction when used as a compressor and in the clockwise direction when used as a motor. The concept of the angular locations of the ports 34 and 35 does not form any part of this invention since it is taught in the prior art, for example, the aforementioned Hill Patent No. 2,547,392.

Among the advantages of the foregoing rotary fluid machine construction is the feature of having balanced pressures on the opposite end faces of the stationary plate 29 so that it does not tilt out of its proper position relative to the rotors 17, 18, 24, and 25. Another advantage is the feature of having the two outer rotors 17 and 18 rigidly locked in place with the outer washers 21 by the drum 6 so that these elements cannot tilt off their axes and provide undesirable leakage paths from the chambers 27.

Although a preferred embodiment of the invention is illustrated and described in detail, it will be understood that the invention is not limited simply to this embodiment, but contemplates other embodiments and variations which utilize the concepts and teachings of this invention.

Having described my invention, I claim:
1. A rotary fluid machine comprising:
 (a) a support frame;
 (b) a drum rotatively mounted on said frame about a first axis;
 (c) a pair of axially-spaced internally-toothed rotors fixed in said drum to rotate with it on said support frame;
 (d) a pair of axially-spaced externally-toothed rotors eccentrically pivoted on said frame about a second axis which is parallel with and spaced from said first axis and engaging said internally-toothed rotors to form fluid displacement chambers between the rotor teeth which are alternately expanded and reduced in volume as said rotors are rotated with said drum about said first axis;
 (e) means carried by the drum and sealing the outer ends of said fluid displacement chambers;
 (f) a stationary plate mounted on said support frame between both pairs of said axially spaced rotors and sealing the inner ends of said fluid displacement chambers;
 (g) and fluid inlet and outlet conduits provided in said stationary plate and opening into said fluid displacement chambers at appropriate locations for conducting fluid into and from said chambers as said drum is rotated, said fluid inlet conduit having inlet ports opening into the fluid displacement chambers on both sides of said stationary plate at the same angular location about said first axis, so that the fluid pressures at the inlet ports are equal on both sides of said stationary plate, and said fluid outlet conduit having outlet ports opening into the fluid displacement chambers on both sides of said stationary plate at the same angular location about the first axis, and angularly spaced from said inlet ports, so that the fluid pressures at the outlet ports are equal on both sides of the stationary plate.

2. The rotary fluid machine of claim 1 including:
 (a) a spacer ring disposed in said drum between said pair of axially-spaced internally-toothed rotors;
 (b) and means clamping said internally-toothed rotors against the ends of said spacer ring to hold said internally-toothed rotors in fixed relationship to said spacer ring and to maintain a fixed spacing between them.

3. The rotary fluid machine of claim 2 wherein said drum is made in two or more sections which are bolted together to clamp said internally-toothed rotors against said spacer ring.

4. The rotary fluid machine of claim 1 wherein said support frame includes a shaft which is eccentrically journaled to rotatively carry said externally-toothed rotors and which fixedly supports said stationary plate.

5. The rotary fluid machine of claim 4 wherein said shaft contains fluid inlet and outlet passages leading to said inlet and outlet conduits in said stationary plate.

References Cited by the Examiner
UNITED STATES PATENTS

| | | | |
|---|---|---|---|
| 1,361,046 | 12/20 | Gollings | 103—126 |
| 1,773,211 | 8/30 | Wilsey | 103—126 |
| 1,795,040 | 3/31 | Renfrew | 103—126 |
| 2,386,896 | 10/45 | Hill et al. | 230—141 |
| 2,490,115 | 12/49 | Clarke | 103—126 |
| 2,531,808 | 11/50 | Eames | 103—126 |
| 2,547,392 | 4/51 | Hill et al. | 103—126 |
| 2,749,843 | 6/56 | Nubling | 103—126 |
| 2,762,195 | 9/56 | Nubling | 103—126 |

JOSEPH H. BRANSON, Jr., *Primary Examiner.*
WILBUR J. GOODLIN, *Examiner.*